United States Patent
Jordan et al.

(10) Patent No.: US 11,774,597 B2
(45) Date of Patent: Oct. 3, 2023

(54) LASER RANGEFINDER SYSTEMS WITH DIVERGENT LENSES FOR AIRCRAFT WINGTIP COLLISION AVOIDANCE SYSTEMS

(71) Applicant: Gulfstream Aerospace Corporation, Savannah, GA (US)

(72) Inventors: Jim Jordan, Savannah, GA (US); Scott Bohanan, Savannah, GA (US); Jeffrey Hausmann, Savannah, GA (US)

(73) Assignee: Gulfstream Aerospace Corporation

( * ) Notice: Subject to any disclaimer, the term of this patent is extended or adjusted under 35 U.S.C. 154(b) by 332 days.

(21) Appl. No.: 17/247,763

(22) Filed: Dec. 22, 2020

(65) Prior Publication Data

US 2022/0196845 A1 Jun. 23, 2022

(51) Int. Cl.

| G01S 17/933 | (2020.01) |
| G01S 17/08 | (2006.01) |
| B64D 47/02 | (2006.01) |
| B64D 45/00 | (2006.01) |
| B64D 43/00 | (2006.01) |
| G08G 5/04 | (2006.01) |

(52) U.S. Cl.
CPC ............ *G01S 17/933* (2013.01); *B64D 43/00* (2013.01); *B64D 45/00* (2013.01); *B64D 47/02* (2013.01); *G01S 17/08* (2013.01); *G08G 5/04* (2013.01)

(58) Field of Classification Search
CPC ...................................................... G01S 17/933
See application file for complete search history.

(56) References Cited

U.S. PATENT DOCUMENTS

| 6,963,293 | B1 * | 11/2005 | Rast | G08G 5/065 |
| | | | | 340/961 |
| 7,046,128 | B2 * | 5/2006 | Roberts | B60Q 9/008 |
| | | | | 340/463 |
| 9,394,059 | B2 * | 7/2016 | Cox | B64D 45/00 |
| 9,701,424 | B2 * | 7/2017 | Hausmann | B64D 47/02 |
| 9,944,407 | B2 * | 4/2018 | O'Dell | H04N 7/181 |
| 10,838,068 | B2 * | 11/2020 | Lukoschat | B64D 45/00 |
| 10,964,221 | B2 * | 3/2021 | Vana | G01S 17/89 |
| 11,635,523 | B2 * | 4/2023 | Toler | G01S 7/4811 |
| | | | | 701/120 |
| 2015/0206439 | A1 * | 7/2015 | Marsden | B64D 47/02 |
| | | | | 701/301 |
| 2018/0284283 | A1 * | 10/2018 | Boucourt | G01S 17/42 |
| 2021/0350716 | A1 * | 11/2021 | Gariel | G08G 5/0078 |
| 2022/0099840 | A1 * | 3/2022 | Toler | G08G 5/065 |
| 2022/0196845 | A1 * | 6/2022 | Jordan | G01S 17/933 |

* cited by examiner

Primary Examiner — Michael A Berns
(74) Attorney, Agent, or Firm — LKGlobal | Lorenz & Kopf, LLP

(57) ABSTRACT

An aircraft includes a fuselage, a main wing coupled with and extending outward from the fuselage, and a collision avoidance system coupled with the fuselage adjacent the main wing. The collision avoidance system includes first and second laser rangefinders and a detection circuit. The first and second laser rangefinders are configured to generate laser beams laterally outward of the fuselage and include diverging lenses spreading the laser beams in a vertical dimension. The detection circuit is coupled with the first laser rangefinder and the second laser rangefinder to: detect an object within a collision risk zone adjacent to the main wing based on input from at least one of the first laser rangefinder and the second laser rangefinder; and generate an alert that the object is at risk of colliding with the main wing.

20 Claims, 4 Drawing Sheets

LASER RANGEFINDER SYSTEMS WITH DIVERGENT LENSES FOR AIRCRAFT WINGTIP COLLISION AVOIDANCE SYSTEMS

TECHNICAL FIELD

Embodiments of the present invention generally relate to aircraft wingtip collision avoidance systems, and more particularly relate to aircraft collision avoidance systems that use laser rangefinders with divergent lenses.

BACKGROUND OF THE INVENTION

Aircraft pilots and ground crew often maneuver aircraft while on the ground. This maneuvering may happen during ground operations such as when the aircraft is taxiing, being towed to or from a hangar, or backing an aircraft away from a terminal.

Obstacles on the ground, such as structures, other aircraft, vehicles, and other obstacles, may lie in the path of a taxing aircraft. Operators are trained to detect these obstacles using their sense of sight. Due to the dimensions of the aircraft (e.g., large wing sweep angles, distance from cockpit to wingtip and winglets on the wingtip) and the operator's limited field of view of the areas surrounding the aircraft, however, it can be difficult for an operator to monitor extremes of the aircraft during ground operations in some situations. As a result, the operator may fail to detect obstacles that may be in the path of the wingtips or winglets of the aircraft. In many cases, the operator may only detect an obstacle when it is too late to take evasive action needed to prevent a collision with an obstacle.

Collisions with an obstacle can damage the aircraft and potentially put the aircraft out of service resulting in flight cancelations. The costs associated with the repair and grounding of an aircraft can be significant. As such, the timely detection and avoidance of obstacles that lie in the ground path of an aircraft is an important issue.

Accordingly, it is desirable to provide methods, systems and apparatus that can reduce the likelihood of and/or prevent collisions between aircraft and obstacles. Furthermore, other desirable features and characteristics of the present invention will become apparent from the subsequent detailed description and the appended claims, taken in conjunction with the accompanying drawings and the foregoing technical field and the foregoing technical field and background.

SUMMARY

In one embodiment, an aircraft includes a fuselage, a main wing coupled with and extending outward from the fuselage, and a collision avoidance system coupled with the fuselage adjacent the main wing. The collision avoidance system includes first and second laser rangefinders and a detection circuit. The first laser rangefinder is configured to generate a first laser beam in a first direction laterally outward of the fuselage and includes a first diverging lens spreading the first laser beam in a vertical dimension. The second laser rangefinder is configured to generate a second laser beam in a second direction laterally outward and farther away from the main wing relative to the first direction and includes a second diverging lens spreading the second laser beam in the vertical dimension. The detection circuit is coupled with the first laser rangefinder and the second laser rangefinder to: detect an object within a collision risk zone adjacent to the main wing based on input from at least one of the first laser rangefinder and the second laser rangefinder; and generate an alert that the object is at risk of colliding with the main wing.

In another embodiment, a collision avoidance system is for an aircraft having a fuselage and a main wing coupled with and extending outward from the fuselage. The collision avoidance system includes a rangefinder housing, a first laser rangefinder, a second laser rangefinder, and a detection circuit. The rangefinder housing is configured to be coupled with the fuselage and includes a transparent wall shaped to form an outer mold line of the aircraft at the fuselage. The first laser rangefinder is configured to generate a first laser beam in a first direction laterally outward of the fuselage, the first laser rangefinder including a first diverging lens spreading the first laser beam in a vertical dimension. The second laser rangefinder is configured to generate a second laser beam in a second direction laterally outward and farther away from the main wing relative to the first direction, the second laser rangefinder including a second diverging lens spreading the second laser beam in the vertical dimension. The detection circuit is coupled with the first laser rangefinder and the second laser rangefinder to detect an object within a collision risk zone adjacent to the main wing based on input from at least one of the first laser rangefinder and the second laser rangefinder and to generate an alert that the object is at risk of colliding with the main wing

DESCRIPTION OF THE DRAWINGS

Embodiments of the present disclosure will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary or the following detailed description.

In general, the embodiments described herein utilize lasers to provide a robust and accurate method to measure distance. In one embodiment, the lasers will operate in the non-visual spectrum (e.g., 905 nm), be eye safe, and be able to detect objects within about a 5-foot vertical height and about a 3-inch horizontal width at the winglet area. The laser Field of View (FOV) can be adjusted by changing optical features (e.g., lens shape). Multiple Lasers may be used on each side of the aircraft to allow early warning of potential obstacles resulting in an aircraft collision. The system communicates the obstacles to the pilots using wired or wireless signals to a Portable Electronic Device (PED), installed Display Unit (DU), or flight deck mounted speakers. An application running on a tablet or integrated into the aircraft avionics will display the obstacles. The application will color code obstacles based on distance indicating the severity of the threat. Different audible alerts will occur for obstacles based on distance indicating the severity of the threat. Speakers located outboard of the pilot and co-pilot in the flight deck will provide directional sound for aural alerts. If the obstacle is located on the left side, the left speaker will indicate the alert. Similarly, if the obstacle is located on the right side, the right speaker will indicate the alert. These embodiments may be used by personnel that are towing the aircraft with the aircraft in a low power mode.

Figure 1:
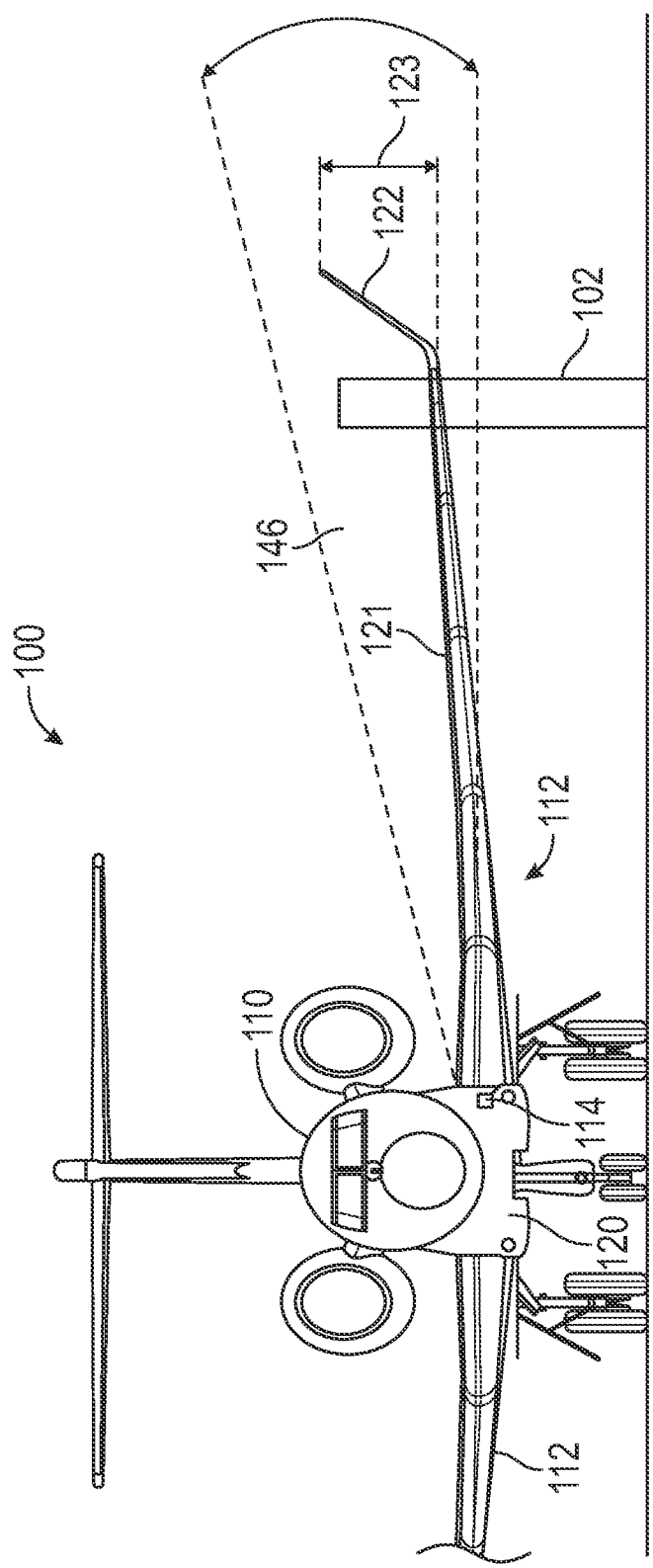
FIGS. 1-2 are front and top illustrations of an aircraft with a laser collision avoidance system in accordance with some embodiments.
Figure 2:
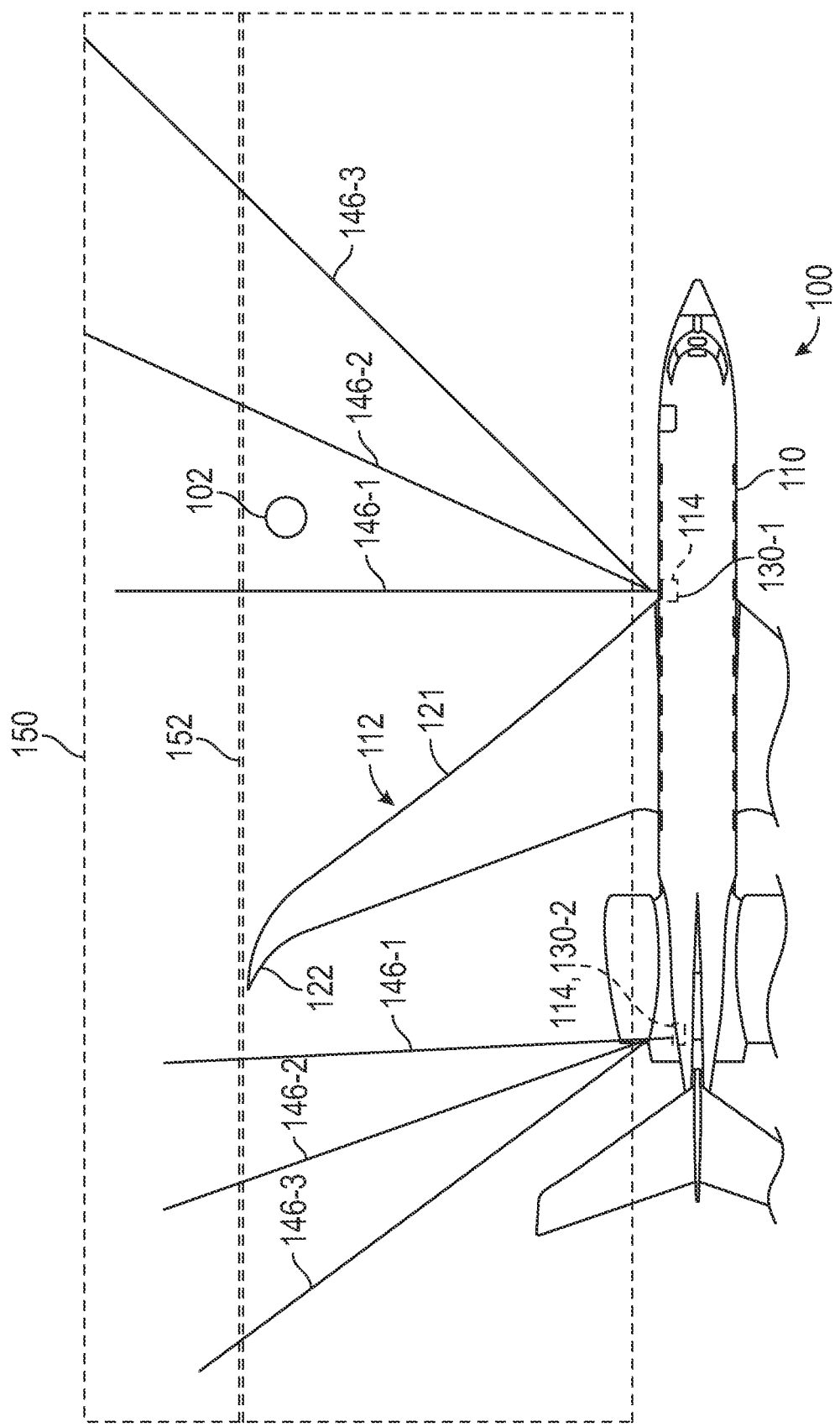

FIGS. 1-2, illustrate an aircraft 100 taxiing near an object 102 in accordance with some embodiments. Aircraft 100 includes a fuselage 110, main wings 112, and at least one collision avoidance system 114. During ground operations collision avoidance system 114 detects the presence and location of obstacles such as object 102, as will be discussed below. Aircraft 100 may be any fixed wing aircraft that taxis or is towed on a ground surface.

Fuselage 110 is the main body section of aircraft 100. As used herein, the term "fuselage" specifically includes the wing-to-body fairing or belly fairing 120. Notably, the term "fuselage" specifically excludes main wings 112 where conventional winglet collision sensors are typically located.

Main wings 112 may have any configuration without departing from the scope of the present disclosure. Main wings 112 include a main portion 121 and a winglet 122 at a distal end of the main portion 121. Main portion 121 is coupled with and extends outward from fuselage 110. Winglet 122 is coupled with main portion 121 and may extend several feet above and outward from the end of main portion 121. In the example provided, winglet 122 has a winglet height 123 in the vertical dimension. As will be appreciated, winglets improve the efficiency of fixed-wing aircraft by increasing the lift generated at the wingtip that reduces lift-induced drag caused by wingtip vortices. This improves the lift-to-drag ratio and increases fuel efficiency of the aircraft. Because winglet 122 may be behind a pilot in the flight deck of aircraft 100 when main wings 112 are highly swept, winglet 122 may be difficult for the pilot to see during taxi operations.

Figure 3:
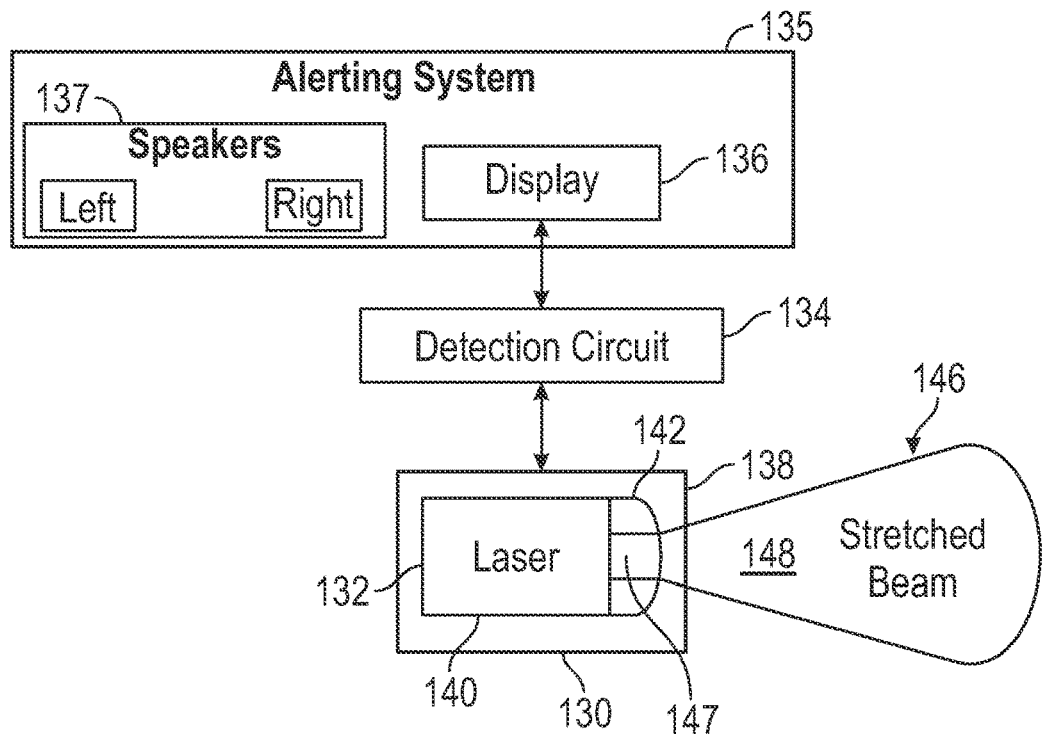
FIGS. 3-4 are simplified side and top cutaway views of a laser housing of the laser collision avoidance system of FIG. 1.
Figure 4:
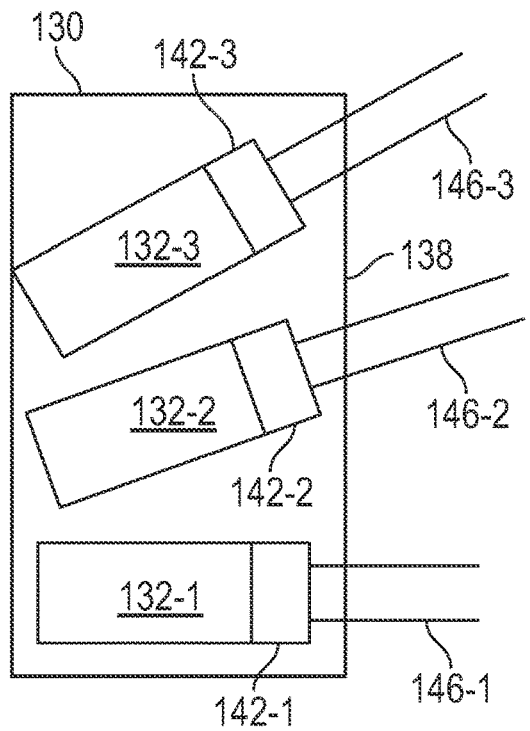

Referring now to FIGS. 3-4, and with continued reference to FIGS. 1-2, collision avoidance system 114 is illustrated in accordance with some embodiments. Collision avoidance system 114 includes a rangefinder housing 130, at least one laser rangefinder 132, a detection circuit 134, and an alerting system 135.

Rangefinder housing 130 is coupled with fuselage 110 adjacent to main wing 112. Rangefinder housing 130 includes mounting positions for each of laser rangefinders 132 in the orientations discussed below. Rangefinder housing 130 may have a transparent side wall 138 through which laser rangefinders 132 may operate. In the example provided, transparent side wall 138 forms the shape of the outer mold line of aircraft 100 and is flush with the surrounding outer skin material. In some alternative embodiments, transparent side wall 138 may form a diverging lens in place of individual diverging lenses for laser rangefinders 132, as will be discussed below. As used herein, the term "transparent" means that rangefinder beam 146 is able to freely pass through the material used to form the transparent component for the wavelength of laser beam 146 in the particular implementation.

The example provided includes a forward mounted rangefinder housing 130-1 and an aft mounted rangefinder housing 130-2, as illustrated in FIG. 2. Forward mounted rangefinder housing 130-1 is disposed in fuselage 110 forward of main wings 112 and is oriented forward to detect objects that are a collision risk when the aircraft is moving forward, as is shown in FIG. 2. Aft mounted rangefinder housing 130-2 is disposed in fuselage 110 aft of main wings 112 and is oriented backward to detect objects that are a collision risk when the aircraft is moving backward, such as during towing operations. Forward and aft mounted rangefinder housings 130-1 and 130-2 are similar to each other, but may differ with the orientation and number of laser rangefinders 132.

Additional and/or alternative locations for rangefinder housings are implemented in some embodiments. For example, rangefinder housings may be mounted on horizontal stabilizers of the aircraft. These horizontal stabilizer-mounted rangefinder housings may be facing forward and/or aft without departing from the scope of the present disclosure.

Laser rangefinders 132 or laser telemeters are simple optical distance measuring devices that require minimal processing. For example, the data generated by laser rangefinders 132 is minimal and is suitable for communication using Universal Asynchronous Receiver/Transmitter ("UART") interfaces. As used herein, the term "laser rangefinder" specifically excludes LIDAR and similar technologies that generate larger data streams and require more extensive processing. For example, laser rangefinders 132 may utilize simple time of flight techniques while LIDAR devices may utilize complex Laser Doppler velocimetry techniques.

Laser rangefinders 132 each include a body 140 and a diverging lens 142. Body 140 generates a rangefinder beam 146, such as by providing electrical power to a laser diode to generate rangefinder beam 146 as a laser. In the example provided, the laser diode generates a laser with a 905 nm wavelength. In some embodiments, multiple laser rangefinders 132 cooperate such that only one laser is firing at any moment to further improve eye safety.

Diverging lens 142 spreads rangefinder beam 146 from an initially generated linear beam 147 into a stretched beam 148. For example, diverging lens 142 may have a convex or a concave shape to bend portions of rangefinder beam 146 away from being collinear with other portions of rangefinder beam 146. Diverging lens 142 has a shape that spreads stretched beam 148 to be taller than winglet height 123 in the vertical dimension at winglet 122. Accordingly, collision avoidance system 114 may detect objects that may collide with the top or the bottom of winglet 122 or main portion 121 of main wing 112. In some embodiments, multiple laser rangefinders 132 share a single diverging lens such that multiple laser rangefinder beams 146 pass through the same diverging lens. The shared diverging lens may be located inside rangefinder housing 130 separate from transparent wall 138 or may be integrated into transparent wall 138 without departing from the scope of the present disclosure.

In the example provided, all of diverging lenses 142 have the same shape. In some embodiments, the curvature of each diverging lens 142 may be selected based on the desired spread of stretched beam 148 and the angle the laser rangefinder 132 is oriented. For example, a laser rangefinder 132 pointing forward will spread more in a given lateral distance than will a laser rangefinder 132 that is pointing directly perpendicular to the aircraft longitudinal axis. Accordingly, some embodiments utilize a diverging lens 142 that spreads rangefinder beam 146 less as the laser angle departs from perpendicular to the aircraft longitudinal axis.

In the example provided, diverging lens 142 only spreads rangefinder beam 146 in the vertical direction with minimal spreading in the lateral direction. In some embodiments, diverging lens 142 may spread rangefinder beam 146 in both the vertical and the lateral directions. In such embodiments, fewer laser rangefinders 132 are required to detect obstacles within a given volume. When object 102 enters a space covered by rangefinder beam 146, detection circuit 134 detects the presence and the distance to object 102.

Laser rangefinders 132 are pointed up such that a bottom edge of stretched beam 148 is proximate to the wingtip, as can be seen in FIG. 1. Because laser rangefinder 132 does not know whether an object is located at a bottom or a top part of the laser rangefinder beam, laser rangefinder 132 is oriented to avoid reaching a ground surface within a range of interest. Similarly, objects that will easily pass underneath main wing 112 may not be of interest and no detection of such objects in necessary.

The top of stretched beam 148 is slightly above the top of winglet 122. For example, a rangefinder beam whose vertical spread is too large and whose top edge is far above the top of winglet 122 may give unnecessary warnings when passing through hangar doors. The vertical spread of stretched beam 148 is selected based on winglet height 123 and the distance to an outer edge of winglet 122. In some embodiments, the vertical spread of stretched beam 148 is no more than twice as tall as winglet height 123.

In the example provided, at least one laser rangefinder 132 includes a first laser rangefinder 132-1, a second laser rangefinder 132-2, a third laser rangefinder 132-3, as can be seen in FIG. 4. First laser rangefinder 132-1 is configured to generate a first rangefinder beam 146-1 in a first direction laterally outward of the fuselage, the first laser rangefinder 132-1 including a first diverging lens 142-1 spreading the first rangefinder beam 146-1 in at least the vertical dimension. In the example provided, the first direction is perpendicular to the longitudinal axis of aircraft 100. The first direction may be at other angles without departing from the scope of the present disclosure. In the example provided, no more than one rangefinder beam 146 detects objects within the same volume. In some embodiments—such as when stretched beam 148 stretches in the horizontal direction—rangefinder beams 146 may partially overlap each other.

Second laser rangefinder 132-2 is configured to generate a second rangefinder beam 146-2 in a second direction laterally outward and farther away from the main wing 112 relative to the first direction. For example, second laser rangefinder 132-2 in forward mounted rangefinder housing 130-1 generates second rangefinder beam 146-2 forward of first rangefinder beam 146-2 of forward mounted rangefinder housing 130-1. Conversely, second laser rangefinder 132-2 in aft mounted rangefinder housing 130-2 generates second rangefinder beam 146-2 aft of first rangefinder beam 146-2 of aft mounted rangefinder housing 130-2, as can be seen in FIG. 2. Second laser rangefinder 132-2 includes a second diverging lens 142-2 spreading the second laser beam in the vertical dimension.

Third laser rangefinder 132-3 is configured to generate a third rangefinder beam 146-3 in a third direction laterally outward and farther away from the main wing 112 relative to the first and second directions. Third laser rangefinder 132-3 includes a third diverging lens 142-3 spreading the third laser beam in the vertical dimension.

Detection circuit 134 is implemented with software and/or hardware modules in a variety of configurations. For example, detection circuit 134 may include one or more processors, software module or hardware modules. The processor(s) reside in single integrated circuits, such as a single or multi-core microprocessor, field programmable gate array (FPGA), or any number of integrated circuit devices and/or circuit boards working in cooperation to accomplish the functions of detection circuit 134. Detection circuit 134 includes a memory system, which may contain the software instructions or data or may be used to store information for transmission, further processing, or later retrieval. In accordance with some embodiments, the memory system is a single type of memory component or includes many different types of memory components. The memory system can include non-volatile memory (e.g., Read Only Memory (ROM), flash memory, etc.), volatile memory (e.g., Dynamic Random Access Memory (DRAM)), or some combination of the two. In some embodiments, detection circuit 134 may be incorporated as software in existing avionics systems. In the example provided, detection circuit 134 is separate from avionics system of aircraft. In some embodiments, detection circuit 134 is located within rangefinder housing 130.

The minimal data generated by laser rangefinders 132 means detection circuit 134 may be less expensive, smaller, and have low power requirements when compared with corresponding circuits for processing LIDAR data. Accordingly, detection circuit 134 and collision avoidance system 114 are suitable for using during low power operations where engines and Auxiliary Power Units ("APUs") on aircraft 100 are not operating. As used herein, the term "detection circuit" specifically excludes circuits whose purpose is to derive LIDAR data or other more complex laser data from simple rangefinder lasers.

Detection circuit 134 is configured to detect object 102 by disregarding measurements from laser rangefinders 132 that are beyond a threshold 150 that is determined based on a lateral distance to the wingtip and a vertical distance that is based on a vertical spread of stretched beam 148. Threshold 150 is a caution threshold within which detection circuit 134 generates an alert that object 102 is present and may be at risk of collision with main wing 112.

In the example provided, detection circuit 134 further defines a warning threshold 152. Detection circuit 134 generates the alert as a caution alert when the object is close to but is not in the path of the wingtip. For example, when object 102 is located between threshold 150 and threshold 152, detection circuit 134 generates the alert as a caution alert. Detection circuit 134 generates the alert as a warning alert when the object is in the path of the wingtip. For example, when object 102 is located between fuselage 110 and threshold 152, detection circuit 134 generates the alert as a warning alert.

In the example provided, detection circuit 134 is further configured to determine a path of main wing 112 based on a steering angle of a front wheel of aircraft 100. For example, detection circuit 134 may calculate a wing growth of main wing 112 based on a steering angle and the pivot axis of aircraft 100 to generate thresholds 150 and 152. Based on the calculated wing growth and threshold locations, detection circuit 134 may cooperate with display 136 to indicate the path of main wing 112 on display 136. In some embodiments, detection circuit 134 determines the amount of time remaining until collision with the object and determines how much braking should be applied to avoid collision with the object. The amount of time and amount of braking may then be communicated to the operator or utilized to automatically apply brakes to avoid the collision.

Alerting circuit 135 includes components that communicate the presence of the detected object to the pilots and/or tug drivers operating the aircraft. In the example provided, alerting circuit 135 includes at least one display 136 and speakers 137. Some embodiments include only speakers, only displays, or speakers and displays in other configurations.

Display 136 is a visual alerting system operationally coupled with detection circuit 134. For example, display 136 may be a primary flight display, multi-functional flight display, a head-up display, traffic collision avoidance display, personal computing device (e.g., a "tablet") for a crew member or tug driver, or other displays in any particular embodiment. In some embodiments, displays 136 includes icons that are illuminated to indicate the occurrence of certain conditions and/or a text message screen to display text information. In some embodiments, display 136 includes exterior aircraft lights for alerting tug drivers of potential collisions.

Figure 5:
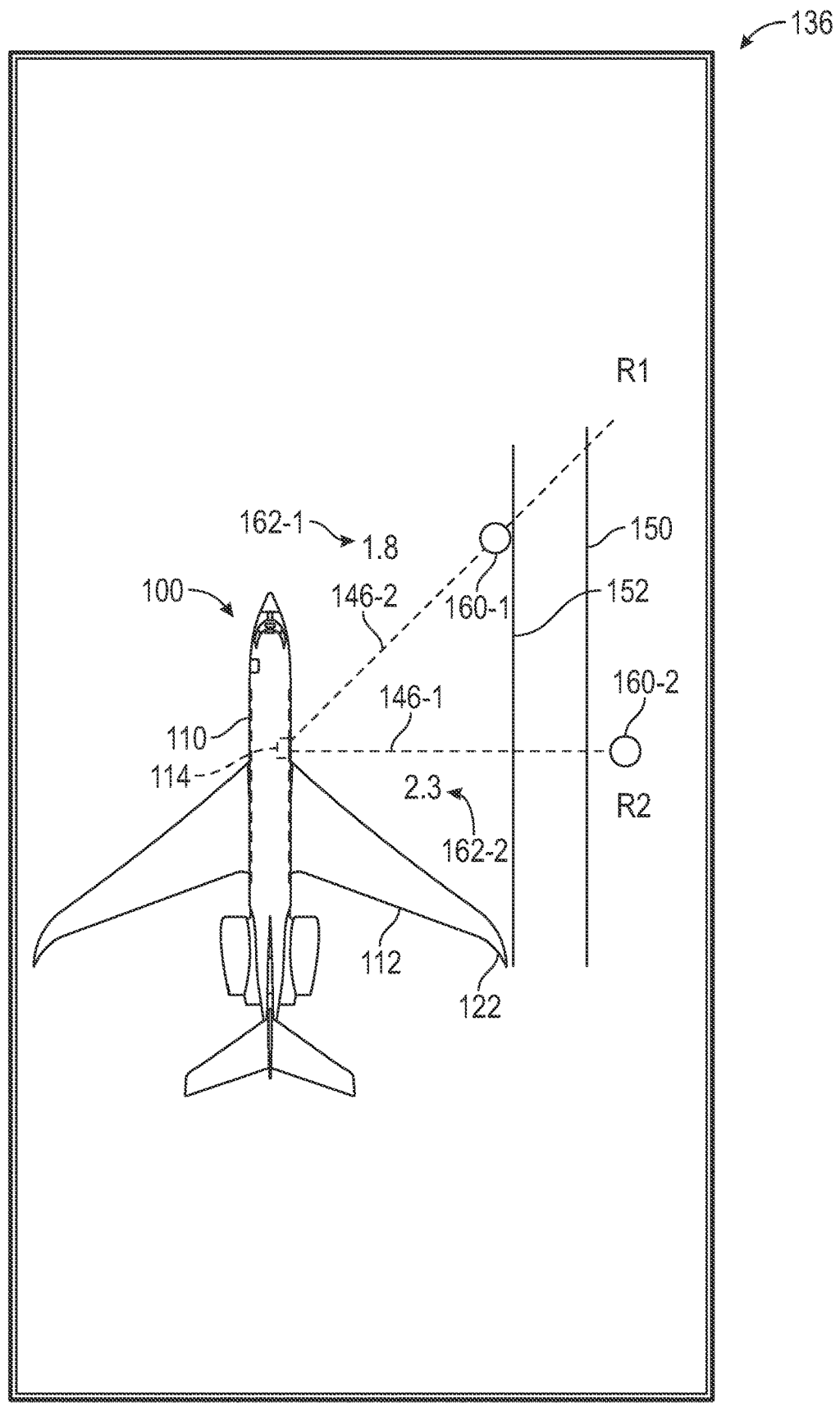
FIG. 5 is an illustration of a display of the laser collision avoidance system of FIG. 1 showing collision alerts for an operator of the aircraft of FIG. 1.

Speakers 137 may be any device configured to communicate aural alerts to the operator provide verbal warnings, alert or warning tones, or other audible information. In the example provided, speakers 137 are located outboard of the pilot and co-pilot in the flight deck will provide directional sound for aural alerts. For example, a left speaker may be located to the left of a pilot seat and a right speaker may be located to the right of a co-pilot seat within the flight deck. If the obstacle is located on the left side, the left speaker will indicate the alert. Accordingly, the alerts from the left and right speakers provide a type of surround sound effect where the source of the audible alert indicates the location of the object. Referring now to FIG. 5, and with continued reference to FIGS. 1-4, an example of display 136 alerting of a potential collision with object 102 is illustrated. In the example provided, display 136 is configured to indicate the alert as a top view of aircraft 100 with indicators 160-1 and 160-2 at the detected position of the objects along with distance values 162-1 and 162-2.

Display 136 color codes the indicators and/or the distance values to indicate the risk of collision. For example, indicator 160-1 may be shown in red as a warning alert because indicator 160-1 is located between fuselage 110 and threshold 152. Similarly, indicator 160-2 may be shown in amber as a caution alert because indicator 160-2 is located between threshold 150 and threshold 152.

It will be appreciated that the various illustrative logical blocks/tasks/steps, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An aircraft, comprising:
    a fuselage;
    a flight deck;
    a main wing coupled with and extending outward from the fuselage; and
    a collision avoidance system coupled with the fuselage adjacent the main wing, the collision avoidance system comprising:
        a first laser rangefinder configured to generate a first laser beam in a first direction laterally outward of the fuselage;
        a second laser rangefinder configured to generate a second laser beam in a second direction laterally outward and farther away from the main wing relative to the first direction;
        a first diverging lens optically coupled with the first laser rangefinder to spread the first laser beam in a vertical dimension;
    a second diverging lens optically coupled with the second laser rangefinder to spread the second laser beam in a vertical dimension, wherein beam spreading characteristics of the first diverging lens are different than beam spreading characteristics of the second diverging lens to account for the first and second directions, and wherein the second diverging lens spreads the second laser beam less as the second angle departs from perpendicular to a longitudinal axis of the aircraft; and
        a detection circuit coupled with the first laser rangefinder and the second laser rangefinder to:
            detect an object within a collision risk zone adjacent to the main wing based on input from at least one of the first laser rangefinder and the second laser rangefinder; and
            generate an alert that the object is at risk of colliding with the main wing.

2. The aircraft of claim 1, wherein the main wing includes a winglet having a winglet height in the vertical dimension, and wherein the first diverging lens has a shape that spreads the first laser beam to be taller than the winglet height in the vertical dimension at the winglet.

3. The aircraft of claim 2, wherein the shape of the first diverging lens does not spread the first laser beam in a horizontal direction.

4. The aircraft of claim 2, wherein the first laser rangefinder and the second laser rangefinder are oriented such that a bottom edge of the first laser beam and the second laser beam are proximate to the winglet.

5. The aircraft of claim 2, wherein the detection circuit is configured to detect the object by disregarding measurements from the first laser rangefinder and the second rangefinder that are beyond a threshold determined based on a lateral distance to the winglet and a vertical distance that is based on a vertical spread of the first laser beam and the second laser beam.

6. The aircraft of claim 1, wherein the collision avoidance system further comprises a rangefinder housing, and wherein the first laser rangefinder and the second laser rangefinder are disposed in the rangefinder housing.

7. The aircraft of claim 6, wherein the rangefinder housing is disposed in the fuselage forward of the main wing and is oriented forward to detect objects that are a collision risk when the aircraft is moving forward.

8. The aircraft of claim 6, wherein the rangefinder housing is disposed in the fuselage aft of the main wing and is oriented backward to detect objects that are a collision risk when the aircraft is moving backward.

9. The aircraft of claim 1, wherein the detection circuit is configured to:
    generate the alert as a caution when the object is close to but is not in a path of the main wing; and
    generate the alert as a warning when the object is in the path of the main wing.

10. The aircraft of claim 1, further comprising a display operationally coupled with the detection circuit, the display configured to indicate the alert as a top view of the aircraft with an indicator at a detected position of the object.

11. The aircraft of claim 10, wherein the display is a portable computing device for use by at least one of a pilot and a tug driver and the display is configured to color-code the alert based on whether the object is in a path of the main wing.

12. A collision avoidance system for an aircraft having a fuselage and a main wing coupled with and extending outward from the fuselage, the collision avoidance system comprising:
    a rangefinder housing configured to be coupled with the fuselage and including a transparent wall shaped to form an outer mold line of the aircraft at the fuselage;
    a first laser rangefinder configured to generate a first laser beam in a first direction laterally outward of the fuselage;
    a second laser rangefinder configured to generate a second laser beam in a second direction laterally outward and farther away from the main wing relative to the first direction;
    at least one diverging lens optically coupled with the first laser rangefinder and the second laser rangefinder to spread the first laser beam and the second laser beam in a vertical dimension; and
    a detection circuit coupled with the first laser rangefinder and the second laser rangefinder to:
        determine a path of the main wing by calculating a wing growth of the main wing based on a steering angle and a pivot axis of the aircraft;
        generate at least one threshold based on a lateral distance to a wingtip of the main wing, the determined path of the main wing, and the calculated wing growth;
        detect an object within a collision risk zone adjacent to the main wing based on input from at least one of the first laser rangefinder and the second laser rangefinder, wherein the collision risk zone is associated with the generated at least one threshold; and
        generate an alert that the object is at risk of colliding with the main wing.

13. The collision avoidance system of claim 12, wherein the first laser rangefinder and the second laser rangefinder are oriented in the rangefinder housing and cooperate with the at least one diverging lens to spread the first laser beam and the second laser beam to have a vertical height that is larger than a winglet height of a winglet at the wingtip of the aircraft when the rangefinder housing is installed on the aircraft.

14. The collision avoidance system of claim 13, wherein the first laser rangefinder and the second laser rangefinder cooperate with the rangefinder housing to be oriented, when installed on the aircraft, such that a bottom edge of the first laser beam and the second laser beam are proximate to the wingtip.

15. The collision avoidance system of claim 13, wherein the detection circuit is configured to detect the object by disregarding measurements from the first laser rangefinder and the second laser rangefinder that are beyond a caution threshold determined based on a lateral distance to the winglet and a vertical distance that is based on a vertical spread of the first laser beam and the second laser beam.

16. The collision avoidance system of claim 12, wherein the detection circuit is configured to:
generate the alert as a caution when the object is close to but is not in a path of the main wing; and
generate the alert as a warning when the object is in the path of the main wing.

17. The collision avoidance system of claim 12, further comprising a display operationally coupled with the detection circuit, the display configured to indicate the alert as a top view of the aircraft with an indicator at a detected position of the object.

18. A collision avoidance system for an aircraft having a fuselage and a main wing coupled with and extending outward from the fuselage and terminating at a wingtip, the collision avoidance system comprising:
a plurality of laser rangefinders, each configured to generate a respective laser beam in the non-visual spectrum, wherein the laser beams generated by the plurality of laser rangefinders are pointed in different directions laterally outward of the fuselage, and wherein the plurality of laser rangefinders are controlled such that only one laser beam is generated at any moment;
at least one diverging lens optically coupled with the plurality of laser rangefinders to spread the laser beams in a vertical dimension; and
a detection circuit coupled with the plurality of laser rangefinders to:
detect an object within a collision risk zone adjacent to the main wing based on input from the plurality of laser rangefinders; and
generate an alert that the object is at risk of colliding with the main wing.

19. The collision avoidance system of claim 18, wherein:
the at least one diverging lens comprises a plurality of diverging lenses; and
beam spreading characteristics of the diverging lenses are different to account for the different directions.

20. The collision avoidance system of claim 18, wherein the detection circuit is configured to:
determine a path of the main wing by calculating a wing growth of the main wing based on a steering angle and a pivot axis of the aircraft; and
generate at least one threshold based on a lateral distance to the wingtip of the main wing, the determined path of the main wing, and the calculated wing growth;
wherein the collision risk zone is associated with the generated at least one threshold.

* * * * *